G. BERGNER.
APPLE PARING AND CORING AND PEACH PARING AND STONING MACHINE.
No. 191,300.   Patented May 29, 1877.
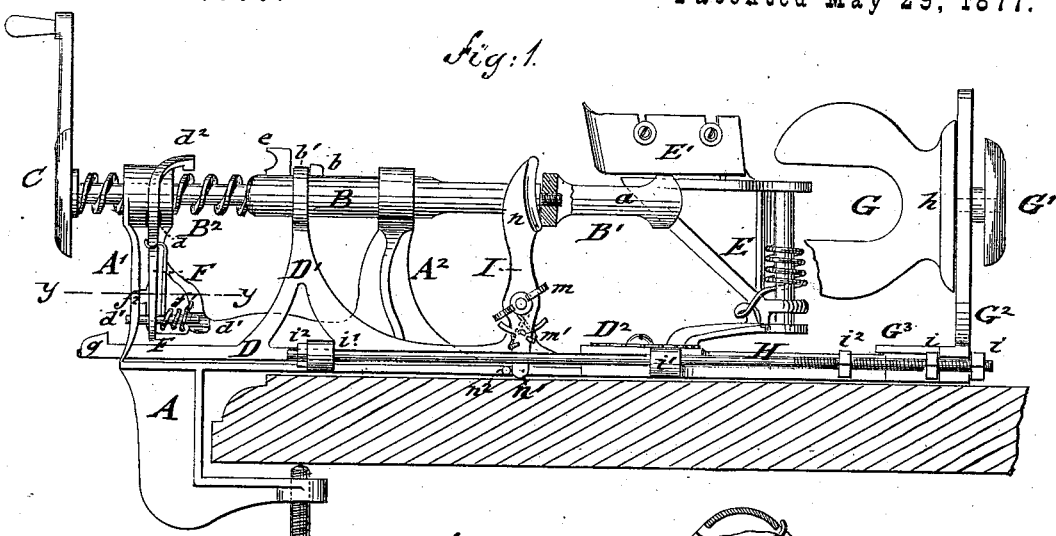
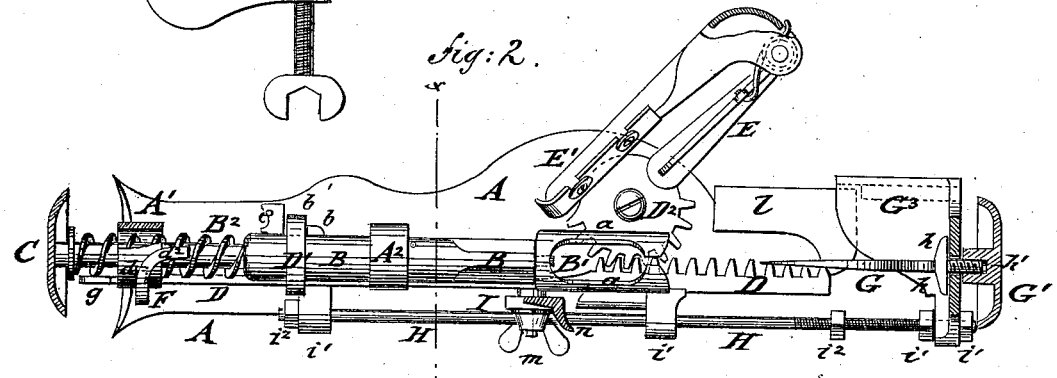
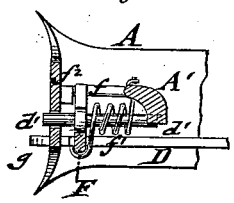
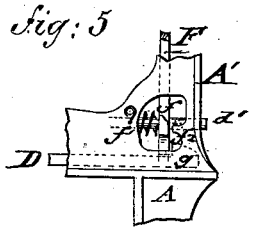
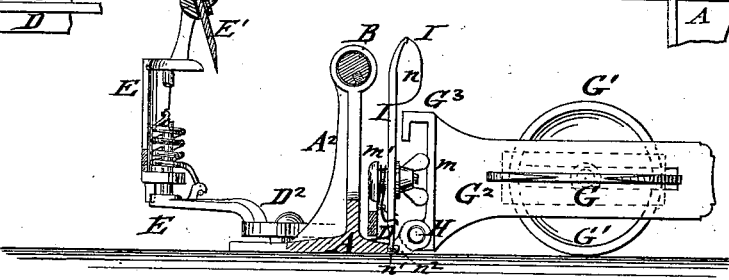
WITNESSES:   INVENTOR:
Chas. Nida   G. Bergner
J. H. Scarborough   BY
   ATTORNEYS.

UNITED STATES PATENT OFFICE.

GEORGE BERGNER, OF WASHINGTON, MISSOURI.

IMPROVEMENT IN APPLE PARING AND CORING, AND PEACH PARING AND STONING MACHINES.

Specification forming part of Letters Patent No. 191,300, dated May 29, 1877; application filed February 3, 1877.

*To all whom it may concern:*

Be it known that I, GEORGE BERGNER, of Washington, in the county of Franklin and State of Missouri, have invented a new and Improved Peach Parer, Slicer, and Stoner, of which the following is a specification:

This invention relates to such improvements on the apple parer, corer, and slicer for which Letters Patent were heretofore granted to me under date of January 9, 1872, and numbered 122,553, that the same may be used either for paring, slicing, and stoning or coring peaches or apples, or for the purpose of paring the fruit merely, as required.

The invention consists of a recessed spring-fork, that is revolved by a hand-crank, in connection with a swinging and spring-acted paring-knife, which is operated by rack-rod and gear, and automatically thrown in or out of motion by a worm-thread of the fork-rod, and a spring-acted rod-holder. The fork-rod holder is acted upon, respectively, by a hook at the end of the sliding rack-rod, or by a fixed lug of the revolving fork-rod, and retained in or out of gear with the worm by suitable locking devices. A longitudinally-sliding and sidewise-swinging slicing-knife is guided along the base-frame, and pushed forward for slicing and stoning the fruit.

A swinging and spring-acted arm is attached to a short post of the rack-rod, and engaged by a fixed lug or pin of the base-frame of the apparatus, to throw the fruit off the fork when it is not desired to slice the same.

In the accompanying drawing, to which reference is made, and which fully illustrates my invention, Figure 1 represents a side elevation of my improved peach parer, slicer, and stoner; Fig. 2, a plan view, partly in horizontal section; Fig. 3, a vertical transverse section on line $x$ $x$, Fig. 2, of the same, showing slicer in downward position. Fig. 4 is a detail horizontal section on line $y$ $y$, Fig. 1, of the mechanism for locking the fork-rod holder; and Fig. 5 is a detail side view of the locking mechanism of fork-shaft holder.

Similar letters of reference indicate corresponding parts.

A in the drawing represents the cast-iron bed or base frame, that is clamped, in the usual manner, to the table or other support.

Frame A supports, in upright standards $A^1$ $A^2$, with hollow bearings, the longitudinal fork rod or shaft B, which carries at one end a detachable spring-fork, $B^1$, having convex semi-sections $a$, with cutting-edges and recessed sides. The spring-fork $B^1$ is screwed, by a threaded socket, to the end of the fork-shaft B.

The toothed portion of the rack-rod gears with a mutilated pinion, $D^2$, which carries the knife-stock E, with its swinging and spring-acted paring-knife $E'$, that is adjusted thereon by set-screws, in the customary manner, and provided with a backwardly-curved edge, for facilitating the beginning of the paring operation. The fork-shaft B has, near the crank end, a worm-thread, $B^2$, which is engaged by a lug, $d$, of a spring-acted arm or holder, F, that swings by pivots $d^1$ in suitable bearings of standard $A^1$, and passes by its lug $d$ through a recess of the bearing of the standard $A^1$ into the worm $B^2$.

A curved top extension, $d^2$, of the arm F is thrown into contact with a fixed projection, $e$, of fork-shaft B, when the same has been turned back to the entire length of the worm, said projection serving, also, to lock jointly with the spring-catch $b$ the standard $D^1$ of the rack-rod to the fork-rod.

The fixed projection $e$ throws the lug $d$ of the arm F out of the worm, and carries a locking lug or arm, $f$, at its lower part, by a spiral spring, $f^1$, into a recess, $f^2$, of standard $A^1$, near the pivots of the swinging holder, so as to secure the same, when in outward position, clear of the worm, the pivots $d^1$ being for this purpose arranged to slide in their bearings.

The turning of the fork-shaft up to its throwing out the holder F carries the paring-knife, by the simultaneous action of the rack-rod and gear, around the peach or apple, and peels, by the spring action of the knife, the same in perfect and reliable manner.

For the purpose of swinging the knife back to its starting position, the fork-shaft $B^1$ is pushed forward by a blow of the hand on the convex knob, while the crank is in downward position, until the hook-shaped end $g$ of the rack-rod D engages the lower part of the holder F and carries the same forward, taking the locking-lug $f$ out of its recess $f^2$, and producing the instant forward swinging of the fork-shaft holder F by the action of its spring, and thereby the re-engaging of the holder with the worm $B^2$, ready for the next paring operation.

For the purpose of slicing the fruit, a forked slicing-knife, G, with two, four, or more arms, having interior cutting-edges, is secured by a flange or base plate, $h$, screw $h'$, and convex clamping-handle $G^1$, to a slotted standard, $G^2$, as shown in Figs. 1 and 2.

The standard $G^2$ is attached by clamp-nuts $i$ to a longitudinal guide-rod, H, that slides parallel to the axis of the fork-shaft, in bearings or supports $i^1$ at the base of the frame A, the extent of sliding motion being controlled by adjustable screw-nuts $i^2$.

The standard $G^2$ is further guided, by its flanged and recessed base $G^3$, along a guide-rail, $l'$, of frame A, to impart a steady motion to the slicing-knife when the same is pushed forward against the fruit by a blow of the hand on the knob $G^1$.

The knife G is adjusted higher or lower on the slotted standard $G^2$, so that the cutting-edges are equidistant from the spring-fork, and pass over the same for slicing the fruit without coming in contact therewith.

After the slicing is completed by the forward pushing of the knife, the spring-fork is turned by a revolution of the crank-handle once around inside of the knife, and thereby the stone twisted out of the peach, being divided in two halves, or as many sections as there are blades of the slicing-knife. The slicing-knife is then drawn back with the left hand, and the stone is dropped through the side opening of the spring-fork, the machine being then ready for the next peach.

When the standard of the slicing-knife is drawn back far enough so that its base clears frame A, it may be swung down on the table, as shown in Fig. 3, either by the hand or by the operation of the paring-knife being swung up again, and pushed forward for slicing, as described.

When it is desired to use the machine for apples, the spring-fork is taken off, and the common fork screwed on the fork-shaft, the slicing-knife being also taken off, and the customary slicing and coring knife attached in its stead, so that thereby the same device may be used as an apple parer, slicer, and corer.

In case the fruit is not intended to be sliced and stoned or cored, the slicing-knife is detached, and an attachment, I, screwed by a thumb-nut onto a short post of sliding rack-rod D, near the fork, the attachment being fulcrumed to a pivot of said post, and acted upon in either direction by a duplex spring, $m'$.

At the upper end of the attachment I is a check, $n$, that is arranged at about the height of the fork, while the pointed lower end $n^1$ passes over a stationary pin, $n^2$, of base-frame A, when the rack-rod is moved back, throwing the peeled fruit off the fork by the sudden forward motion of the arm I, imparted by the contact with the stationary pin $n^2$ when the fork-rod is pushed forward. The machine operates thus with this attachment in the nature of a common parer.

When it is desired to slice and stone or core the fruit, the attachment is removed by unscrewing the thumb-nut, the double spring being seated around the bearing or sleeve, and attached to the sides of the arm securely thereon. The peeled fruit is then not thrown off before it reaches the slicing-knife, the attachment being only used for paring. The machine may thus be employed for paring merely, or for paring, slicing, and stoning or coring, as desired, it forming a quickly-worked and effective device for preparing peaches for canning, for slicing apples for drying, and also for other fruits of round shape.

Having thus described my invention, I claim as new and desire to secure by Letters Patent—

1. In peach and apple parers, the combination of the fork-shaft, having end screw, with a detachable and interchangeable fork, having a central screw-socket, substantially as and for the purpose set forth.

2. The combination of the fork-shaft B, having fixed lug $e$, with the curved top extension $d^2$ of the swinging and spring-acted fork-shaft holder F, to throw the same out of gear with worm of fork-shaft, substantially as described.

3. The combination of the swinging and spring-acted fork-shaft holder F, having lug or arm $f$ and sliding pivots $d^1$, with standard having recess $f^2$ of standard $A^1$, to retain the holder securely when in or out of gear with worm, as set forth.

4. The combination of sliding rack-rod D, having hook-shaped end $g'$, with the swinging and spring-acted fork-rod holder F, having sliding pivots $d$, to throw the holder into gear with worm by the forward movement of fork-rod, substantially as described.

5. The combination of base-frame A, having guide-supports $i^1$, with slide-rod H, having adjustable screw-nuts $i^2$, and swinging knife-standard $G^1$, substantially as and for the purpose described.

6. The combination of base-frame A, having supports $i^1$ and guide-rail $l$, with slide-rod H and flanged base-frame of knife-standard $G^1$, substantially as set forth.

7. The combination of the slicing-knife G, having base-plate $h$ and screw $h'$, with the slotted standard $G^1$ and convex clamping-knob $G^2$, substantially as described.

GEORGE BERGNER.

Witnesses:
G. MUNCH,
E. GOEBEL.